United States Patent
Lv

(10) Patent No.: US 8,831,114 B2
(45) Date of Patent: Sep. 9, 2014

(54) METHOD, APPARATUS, AND SYSTEM FOR PROCESSING SIGNALS BASED ON TWISTED PAIR

(71) Applicant: Huawei Technologies Co., Ltd., Shenzhen (CN)

(72) Inventor: Jie Lv, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/972,181

(22) Filed: Aug. 21, 2013

(65) Prior Publication Data

US 2013/0336413 A1 Dec. 19, 2013

Related U.S. Application Data

(63) Continuation of application No. PCT/CN2012/071320, filed on Feb. 20, 2012.

(30) Foreign Application Priority Data

Feb. 25, 2011 (CN) .......................... 2011 1 0046287

(51) Int. Cl.
| | |
|---|---|
| *H04B 3/00* | (2006.01) |
| *H04L 25/00* | (2006.01) |
| *H04B 3/28* | (2006.01) |
| *H04B 3/32* | (2006.01) |
| *H04L 5/20* | (2006.01) |
| *H04L 1/06* | (2006.01) |
| *H04L 25/08* | (2006.01) |
| *H04L 25/02* | (2006.01) |

(52) U.S. Cl.
CPC .. *H04B 3/32* (2013.01); *H04B 3/28* (2013.01); *H04L 5/20* (2013.01); *H04L 1/06* (2013.01); *H04L 25/085* (2013.01); *H04L 25/0276* (2013.01); *H04L 25/0272* (2013.01)
USPC .......................................................... 375/257

(58) Field of Classification Search
USPC .......................................................... 375/257
See application file for complete search history.

(56) References Cited

U.S. PATENT DOCUMENTS

| | | | | |
|---|---|---|---|---|
| 6,185,263 B1 * | 2/2001 | Chan | ............................. | 375/295 |
| 6,295,356 B1 * | 9/2001 | De Nicolo | .................... | 379/413 |

(Continued)

FOREIGN PATENT DOCUMENTS

| | | |
|---|---|---|
| CN | 1476183 | 2/2004 |
| CN | 101061667 A | 10/2007 |

(Continued)

OTHER PUBLICATIONS

International Search Report mailed May 24, 2012 in corresponding International Application No. PCT/CN2012/071320.

(Continued)

*Primary Examiner* — Shuwang Liu
*Assistant Examiner* — Nader Bolourchi
(74) *Attorney, Agent, or Firm* — Staas & Halsey LLP

(57) ABSTRACT

Embodiments of the present invention relate to the field of communication technologies, and in particular, to a method, an apparatus, and a system for processing signals based on a twisted pair. The method for processing signals based on a twisted pair includes: determining a signal processing manner; performing, according to the signal processing manner, digital processing on signals of the extended channels that are to be sent to convert the signals of the extended channels into common mode signals of each twisted pair; and sending the converted common mode signals of the each twisted pair to corresponding twisted pairs for transmission.

22 Claims, 9 Drawing Sheets

(56) References Cited

U.S. PATENT DOCUMENTS

| | | | |
|---|---|---|---|
| 6,507,608 B1* | 1/2003 | Norrell | 375/219 |
| 6,715,087 B1* | 3/2004 | Vergnaud et al. | 713/300 |
| 2002/0063584 A1* | 5/2002 | Molenda et al. | 327/67 |
| 2005/0053229 A1* | 3/2005 | Tsatsanis et al. | 379/406.01 |
| 2006/0109728 A1 | 5/2006 | Dwelley et al. | |
| 2006/0268966 A1 | 11/2006 | Cioffi et al. | |
| 2007/0291668 A1 | 12/2007 | Duan | |
| 2008/0285627 A1 | 11/2008 | Bruas | |
| 2008/0299972 A1 | 12/2008 | Weese | |
| 2009/0034592 A1* | 2/2009 | Mirfakhraei et al. | 375/222 |
| 2009/0097452 A1 | 4/2009 | Gogic | |
| 2009/0310522 A1 | 12/2009 | Bertonis et al. | |
| 2010/0054237 A1 | 3/2010 | Han et al. | |
| 2010/0111070 A1 | 5/2010 | Hsu | |
| 2010/0136903 A1* | 6/2010 | Lee et al. | 455/17 |
| 2010/0157906 A1 | 6/2010 | Yang et al. | |
| 2010/0208720 A1 | 8/2010 | Fujishima et al. | |
| 2010/0215032 A1 | 8/2010 | Jalloul et al. | |
| 2010/0222068 A1 | 9/2010 | Gaal et al. | |
| 2010/0226358 A1 | 9/2010 | Cordeiro | |
| 2011/0013725 A1* | 1/2011 | Chan | 375/296 |
| 2012/0237017 A1 | 9/2012 | Li et al. | |

FOREIGN PATENT DOCUMENTS

| | | |
|---|---|---|
| CN | 101132284 A | 2/2008 |
| CN | 101316136 | 12/2008 |
| CN | 101384019 | 3/2009 |
| CN | 101630496 A | 1/2010 |
| CN | 102244528 A | 11/2011 |
| EP | 1 804 540 | 7/2007 |
| EP | 1906545 A2 | 4/2008 |
| KR | 10-0864768 | 10/2008 |
| WO | WO 2006/075247 A1 | 7/2006 |
| WO | WO 2009/058790 A1 | 5/2009 |

OTHER PUBLICATIONS

International Search Report with Written Opinion of International Search Report mailed Mar. 15, 2012 in corresponding International Application No. PCT/CN2011/083597.

European Search Report issued Sep. 19, 2013 in corresponding European Application No. 11847110.1.

Extended European Search Report dated Apr. 4, 2014 in corresponding European Patent Application No. 12749735.2 (7 pages).

Broadband Forum: Marketing Report; "MR-257 *An Overview of G993.5 Vectoring*"; Issue: 1, Issue Date: May 2012; pp. 1-25.

"*Series G: Transmission Systems and Media, Digital Systems and Networks*"; Digital sections and digital line system—Access networks, Ethernet-based multi-pair bonding; International Telecommunication Union G.998.2; Jan. 2005; (18 pages).

Chinese Office Action dated Oct. 12, 2013 in corresponding Chinese Patent Application No. 201110046287.8 (5 pages).

International Search Report dated Feb. 20, 2012 in corresponding PCT/CN2012/071320 (11 pages).

* cited by examiner

US 8,831,114 B2

METHOD, APPARATUS, AND SYSTEM FOR PROCESSING SIGNALS BASED ON TWISTED PAIR

CROSS-REFERENCE TO RELATED APPLICATIONS

This application is a continuation of International Application No. PCT/CN2012/071320, filed on Feb. 20, 2012, which claims priority to Chinese Patent Application No. CN201110046287.8, filed on Feb. 25, 2011, both of which are hereby incorporated by reference in their entireties.

TECHNICAL FIELD

Embodiments of the present invention relate to the field of communication technologies, and in particular, to a method, an apparatus, and a system for processing signals based on a twisted pair.

BACKGROUND

With the rapid development of high-speed data services, communication capacities and access rates provided by digital subscriber line technologies that transmit signals based on a twisted pair cannot meet requirements of users gradually. Accordingly, a method for extending channels is provided in the industry. By using this method, N−1 extended channels are extended on the basis of N twisted pairs, so that the number of channels including the extended channels reaches 2N−1. In the foregoing method, specifically, extended channels are generated by making a difference between common mode (CM, Common Mode) signals of each two twisted pairs, whereas original channel transmission modes remain unchanged, and signals are still transmitted by using a twisted pair differential mode (DM, Differential Mode). However, signals that are to be transmitted over the extended channels are divided into two equal parts whose directions are opposite to each other, which are transmitted by using the original common mode signals of the two twisted pairs; signals of the extended channels may be acquired at a receiving end by making a difference between the original common mode signals of the two twisted pairs.

To provide a higher access rate for users, multiple twisted pairs are generally bound, and collaborative receiving and sending is performed by using multiple transceivers. In the bound multiple twisted pairs, the extended channel is not unique. Taking binding four twisted pairs Pair 1 to Pair 4 as an example, there may be following three types of extended channels: Type 1. A non-cascade extended channel (NCEC) is extended by making a difference between common mode signals of the Pair 1 and the Pair 4, another NCEC is extended by making a difference between common mode signals of the Pair 2 and the Pair 3, and further, a cascade extended channel (CEC) may be generated by making a difference between common mode signals of these two NCECs; Type 2. An NCEC is extended by making a difference between the common mode signals of the Pair 1 and the Pair 2, another NCEC is extended by making a difference between the common mode signals of the Pair 3 and the Pair 4, and further, a CEC may also be generated by making a difference between the common mode signals of these two NCECs; Type 3. An NCEC is extended by making a difference between the common mode signals of the Pair 1 and the Pair 3, and another NCEC is extended by making a difference between the common mode signals of the Pair 2 and the Pair 4, and further, a CEC may also be generated by making a difference between the common mode signals of these two NCECs. In actual applications, different extended channels are generally selected according to actual requirements. In this way, different extended channels need to be implemented by using a method to meet actual requirements. The prior art provides a solution that different extended channels are implemented by using electronic switches. As shown in FIG. 1, the solution is as follows: When an electronic switch K1 is connected to a circuit 1, an NCEC 1 is extended by making a difference between common mode signals of a Pair 1 and a Pair 2; when an electronic switch K2 is connected to a circuit 2 and an electronic switch K3 is connected to a circuit 3, an NCEC 2 is extended by making a difference between common mode signals of a Pair 3 and a Pair 4; when the electronic switch K1 is connected to the circuit 2, the NCEC 1 is extended by making a difference between common mode signals of the Pair 1 and the Pair 3; when the electronic switch K2 is connected to the circuit 1 and the electronic switch K3 is connected to a circuit 4, the NCEC 2 is extended by making a difference between common mode signals of the Pair 2 and the Pair 4; when the electronic switch K1 is connected to the circuit 3, the NCEC 1 is extended by making a difference between the common mode signals of the Pair 1 and the Pair 4; when the electronic switch K2 is connected to the circuit 1 and the electronic switch K3 is connected to the circuit 2, the NCEC 2 is extended by making a difference between the common mode signals of the Pair 2 and the Pair 3, where the twisted pairs Pair 1 to Pair 4 are also referred to as differential mode channels DM1 to DM4, and a CEC may also be extended by making a difference between the common mode signals of the NCEC 1 and the NCEC 2.

In the solution illustrated in FIG. 1, three electronic switches are set to implement extended channels. When too many twisted pairs are employed, the number of electronic switches is proportional to the square of the number of twisted pairs in the solution illustrated in FIG. 1, thereby increasing difficulties in implementing extended channels and making the system structure more complex.

SUMMARY

Embodiments of the present invention provide a method and an apparatus for processing signals based on a twisted pair to reduce difficulties in implementing extended channels and simplify the system structure.

A method for processing signals based on a twisted pair includes:

determining a signal processing manner, where the signal processing manner includes acquiring signals of each extended channel by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs;

performing, according to the signal processing manner, digital processing on signals of the extended channels that are to be sent to convert the signals of the extended channels into common mode signals of each of the twisted pairs; and sending the converted common mode signals of the each twisted pair to corresponding twisted pairs for transmission.

A method for processing signals based on a twisted pair includes:

acquiring common mode signals of twisted pairs;

performing digital processing on the common mode signals according to a signal processing manner to convert the common mode signals into received signals of extended channels, where the signal processing manner includes acquiring the received signals of the extended channels by making a difference between common mode signals of any two of the twisted pairs, or by making a difference between a sum of common mode signals of at least two of the twisted pairs and common mode signals of any another of the twisted pairs, or by making a difference between a sum of common mode signals of at least two of the twisted pairs and a sum of common mode signals of at least another two of the twisted pairs.

Accordingly, an embodiment of the present invention provides an apparatus for processing signals based on a twisted pair, including:

a determining unit, configured to determine a signal processing manner, where the signal processing manner includes acquiring signals of each extended channel by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs;

a converting unit, configured to perform, according to the signal processing manner, digital processing on signals of the extended channels that are to be sent to convert the signals of the extended channels into common mode signals of each of the twisted pairs; and a sending unit, configured to send the common mode signals of the each twisted pair converted by the converting unit to each of the twisted pairs for transmission.

Accordingly, an embodiment of the present invention provides an apparatus for processing signals based on a twisted pair, including:

an obtaining unit, configured to acquire common mode signals of twisted pairs; and a converting unit, configured to perform digital processing on the common mode signals according to a signal processing manner to convert the common mode signals into received signals of extended channels, where the signal processing manner includes acquiring the received signals of the extended channels by making a difference between common mode signals of any two of the twisted pairs, or by making a difference between a sum of common mode signals of at least two of the twisted pairs and common mode signals of any another of the twisted pairs, or by making a difference between a sum of common mode signals of at least two of the twisted pairs and a sum of common mode signals of at least another two of the twisted pairs.

Accordingly, an embodiment of the present invention provides a system for processing signals based on a twisted pair, including:

a transmitting end, configured to determine a signal processing manner, where the signal processing manner includes acquiring signals of each extended channel by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs; perform, according to the signal processing manner, digital processing on signals of the extended channels that are to be sent to convert the signals of the extended channels into common mode signals of each of the twisted pairs; and send the converted common mode signals of the each twisted pair to each of the twisted pairs for transmission to a receiving end; and the receiving end, configured to acquire common mode signals of the twisted pairs, and perform digital processing on the common mode signals according to the signal processing manner to convert the common mode signals into received signals of the extended channels.

Accordingly, an embodiment of the present invention further provides a computer program product including computer program code. The computer program code, when being executed by a computer unit, enables the computer unit to perform actions disclosed in the foregoing method for processing signals.

In the embodiments of the present invention, a signal processing manner is determined; digital processing is performed, according to the determined signal processing manner, on signals of extended channels that are to be sent to convert the signals of the extended channels into common mode signals of each twisted pair; the converted common mode signals of the each twisted pair are sent to corresponding twisted pairs for transmission. In this way, extended channels can be implemented at a transmitting end. In addition, in the embodiments of the present invention, common mode signals of twisted pairs may also be acquired, and digital processing is performed on the common mode signals according to a signal processing manner to convert the common mode signals into received signals of extended channels. In this way, extended channels can be implemented at a receiving end. In the embodiments of the present invention, in the process of implementing extended channels, extended channels are implemented without the need of setting electronic switches, thereby reducing difficulties in implementing extended channels and simplifying the system structure.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments acquired by persons of ordinary skill in the art based on the embodiment of the present invention without creative efforts shall fall within the protection scope of the present invention.

To make the aspects, characteristics and advantages of the embodiments of the present invention more comprehensible, the embodiments of the present invention are described in detail with reference to the accompanying drawings in the following.

Embodiment 1

Figure 1:
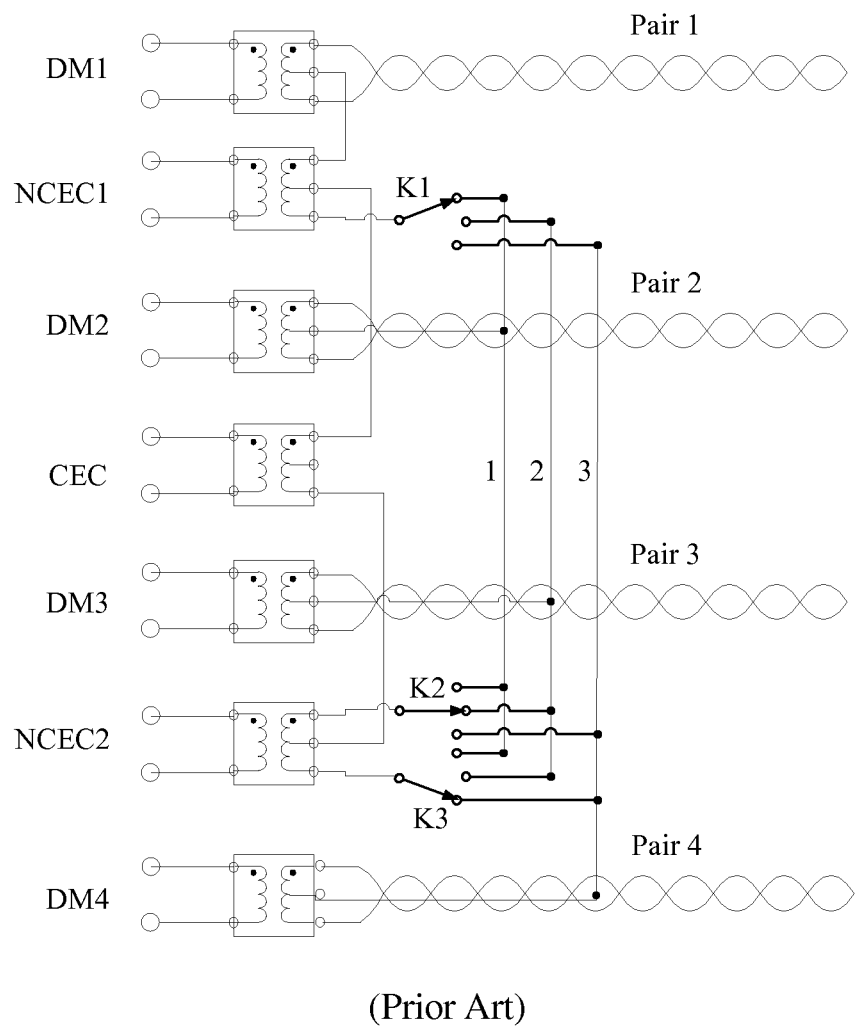
FIG. 1 is circuit diagram illustrating a process of implementing extended channels by using electronic switches in the prior art.
Figure 2:
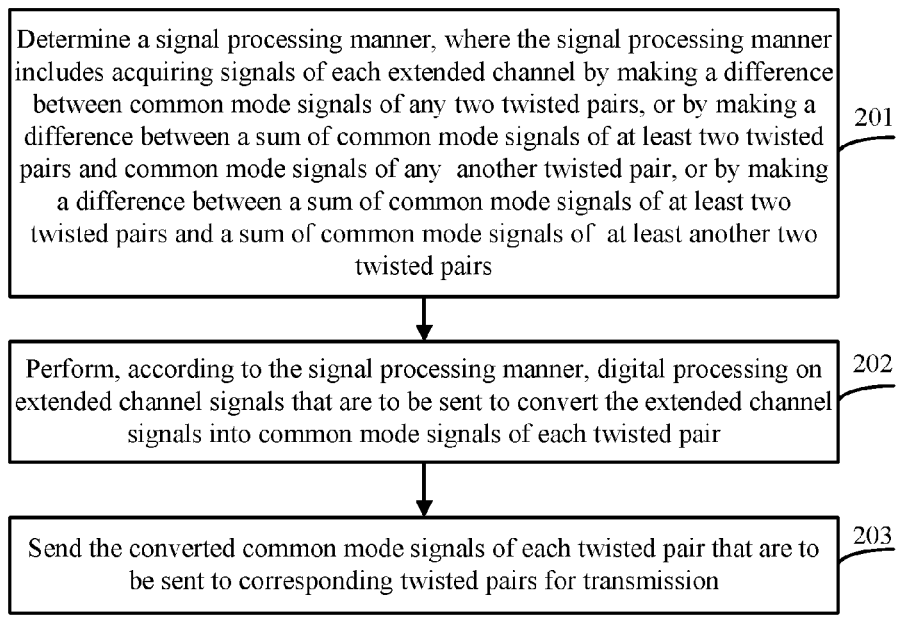
FIG. 2 is a schematic flowchart of a method for processing signals based on a twisted pair according to an embodiment of the present invention.

Referring to FIG. 2, FIG. 2 is a schematic flowchart of a method for processing signals based on a twisted pair according to an embodiment of the present invention. The method may include the following steps:

201. Determine a signal processing manner, where the signal processing manner includes acquiring signals of each extended channel by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs.

In the embodiment of the present invention, the following relationships may exist between the foregoing signal processing manner and an extended channel generation manner:

When a signal X1 of an extended channel is acquired by making a difference between a common mode signal CM1 of a twisted pair Pair 1 and a common mode signal CM2 of a twisted pair Pair 2, it is equivalent to that an NCEC is extended by making a difference between common mode signals of the twisted pair Pair 1 and the twisted pair Pair 2; similarly, when a signal X2 of an extended channel is acquired by making a difference between a common mode signal CM3 of a twisted pair Pair 3 and a common mode signal CM4 of a twisted pair Pair 4, it is equivalent to that an NCEC is extended by making a difference between common mode signals of the twisted pair Pair 3 and the twisted pair Pair 4; further, when a signal X3 of an extended channel is acquired by making a difference between a sum of the CM1 and the CM2 and a sum of the CM3 and the CM4, it is equivalent to that a cascade extended channel CEC is generated by making a difference between common mode signals of the two NCECs.

In the embodiment of the present invention, when a transmitting end needs to implement extended channels in bound multiple twisted pairs and send data by using extended channels, the transmitting end may determine a signal processing manner (that is, equivalent to an extended channel generation manner) according to actual requirements.

For example, the transmitting end may determine the following signal processing manner (that is, equivalent to the extended channel generation manner) according to actual requirements: A difference between the common mode signals of the twisted pair Pair 1 and the twisted pair Pair 4 is made (that is, equivalent to that an NCEC is extended by making a difference between the common mode signals of the twisted pair Pair 1 and the twisted pair Pair 4), and a difference between the common mode signals of the twisted pair Pair 2 and the twisted pair Pair 3 is made (that is, equivalent to that another NCEC is extended by making a difference between the common mode signals of the twisted pair Pair 2 and the twisted pair Pair 3); or a difference between the common mode signals of the twisted pair Pair 1 and the twisted pair Pair 2 is made (that is, equivalent to that an NCEC is extended by making a difference between the common mode signals of the twisted pair Pair 1 and the twisted pair Pair 2), and a difference between the common mode signals of the twisted pair Pair 3 and the twisted pair Pair 4 is made (equivalent to that another NCEC is extended by making a difference between the common mode signals of the twisted pair Pair 3 and the twisted pair Pair 4). Further, the transmitting end may also make a difference between the common mode signals of the two NCECs (equivalent to a process of generating a cascade extended channel CEC by making a difference between the common mode signals of the two NCECs, where the cascade extended channel CEC is equivalently generated by making a difference between the sums of common mode signals of twisted pairs corresponding to the two NCECs). Certainly, the transmitting end may also select any two twisted pairs from the bound multiple twisted pairs, and generate an extended channel by making a difference between the common mode signals of the selected any two twisted pairs, which is not specifically limited by the embodiment of the present invention.

As an optional implementation manner, in the embodiment of the present invention, a signal processing manner (that is, equivalent to the extended channel generation manner) may be interacted between the transmitting end and the receiving end, so that it can be guaranteed that the transmitting end and the receiving end use the same signal processing manner (that is, equivalent to the extended channel generation manner). The process of interaction on the signal processing manner (that is, equivalent to the extended channel generation manner) between the transmitting end and the receiving end may be carried out at the channel initialization phase, and the signal processing manner is transmitted by using a field of a channel initialization interaction message. That is, the transmitting end may receive the signal processing manner (that is, equivalent to the extended channel generation manner) sent by the receiving end by using a channel initialization interaction message.

202. Perform, according to the signal processing manner, digital processing on signals of the extended channels that are to be sent to convert the signals of the extended channels into common mode signals of each twisted pair.

For example, it is assumed that the extended channel generation manner is as follows: An extended channel 1 (NCEC) is generated by making a difference between the common mode signals of the twisted pair Pair 1 and the twisted pair Pair 3; an extended channel 2 (NCEC) is generated by making a difference between the common mode signals of the twisted pair Pair 2 and the twisted pair Pair 4; and an extended channel 3 (CEC) is generated by making a difference between the sum of the common mode signals of the twisted pair Pair 1 and the twisted pair Pair 3 and the sum of the common mode signals of the twisted pair Pair 2 and the twisted pair Pair 4. And it is assumed that modulated signals in the extended channels 1, 2, and 3 that are to be sent (or received signals that need to be demodulated) are X1, X2, and X3 respectively and common mode signals that are to be sent in the twisted pairs Pair 1, Pair 2, Pair 3, and Pair 4 are CM1, CM2, CM3, and CM4.

Then, according to the relationships between the signal processing manner and the extended channel generation manner, it may be obtained that the following relationships exist between the signals X1, X2, and X3 of the extended channels 1, 2, and 3 that are to be sent and the common mode signals CM1, CM2, CM3, and CM4 that are to be sent in each of twisted pairs Pair 1 to Pair 4:

$$X1 = CM1 - CM3; \qquad (1)$$

$$X2 = CM2 - CM4; \qquad (2)$$

$$X3 = (CM1 + CM3) - (CM2 + CM4); \qquad (3)$$

Differential mode transmission needs to meet a condition that the sum of common mode signals in each twisted pair is 0, that is, the following expression may be acquired: CM1+CM2+CM3+CM4=0; by using this expression and formulas (1) to (3), the following CM1, CM2, CM3, and CM4 represented by using the X1, X2, and X3 may be acquired:

$$CM1 = X1/2 + X3/4 \qquad (4)$$

$$CM2 = X2/2 - X3/4 \qquad (5)$$

$$CM3 = -X1/2 + X3/4 \qquad (6)$$

$$CM4 = X2/2 - X3/4 \qquad (7)$$

203. Send the converted common mode signals of each twisted pair that are to be sent to corresponding twisted pairs for transmission.

In the embodiment of the present invention, at the transmitting end, the signals X1, X2, and X3 of the extended channels that are to be sent may be processed by using the formulas (4) to (7) to convert the signals of the extended channels into common mode signals CM1, CM2, CM3, and CM4 of twisted pairs Pairs 1, 2, 3, and 4, and these common mode signals are transmitted by using the twisted pairs Pairs 1, 2, 3, and 4 respectively.

At the receiving end, the common mode signals CM1, CM2, CM3, and CM4 received from each of the twisted pairs Pairs 1, 2, 3, and 4 may be processed by using the formulas (1) to (3) to acquire the received signals X1, X2, and X3 in the extended channels. For example, the receiving end may acquire the received signal X1 of the extended channel by making a difference between the common mode signals CM1 and CM3 received from the twisted pairs Pair 1 and Pair 3; the receiving end may acquire the received signal X2 of the extended channel by making a difference between the common mode signals CM2 and CM4 received from the twisted pairs Pair 2 and Pair 4; further, the receiving end may also acquire the received signal X3 of the extended channel by making a difference between the sum of the common mode signals of the twisted pairs Pair 1 and Pair 3 and the sum of the common mode signals CM2 and CM4 of the twisted pairs Pair 2 and Pair 4.

In the embodiment of the present invention, an example of four twisted pairs is detailed above, and the number of twisted pairs may be extended to any number in the foregoing method provided in the embodiment of the present invention.

In the embodiment of the present invention, it is assumed that there are a total of N twisted pairs, M extended channels may be generated by using the foregoing method provided in the embodiment of the present invention; if the original N DM channels are added, the total number of channels carried by the N twisted pairs is equal to N+M. To ensure that signals of the M extended channels are mutually exclusive, M and N need to meet the following condition: 1≤M≤N−1.

Figure 3:
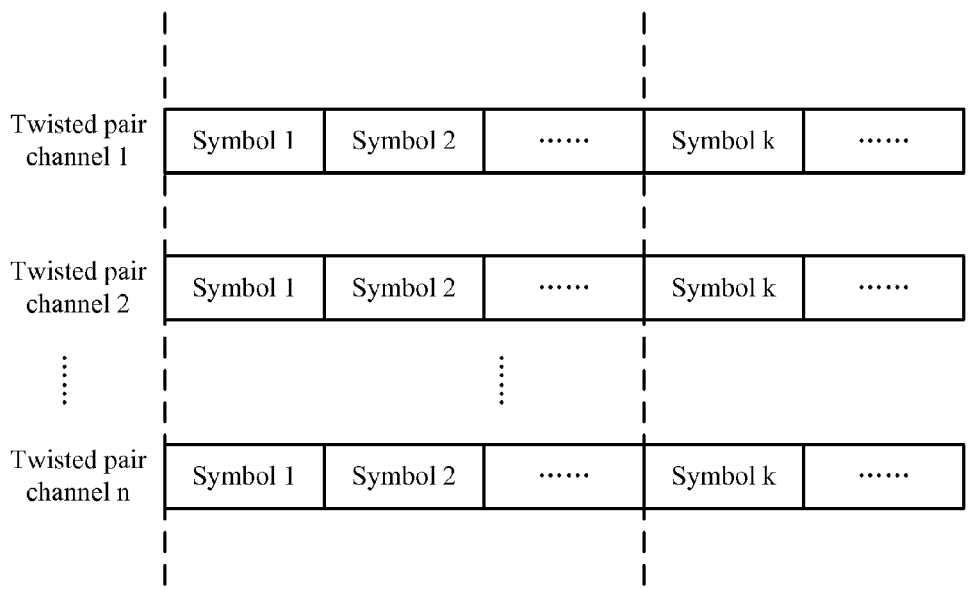
FIG. 3 is a schematic diagram illustrating the alignment of time points of symbols according to an embodiment of the present invention.

In the embodiment of the present invention, the bound multiple twisted pairs need to perform collaborative receiving and sending. To ensure the transmission consistency, sending/receiving time points of common mode signal symbols of all twisted pairs should be aligned. FIG. 3 illustrates the alignment of sending/receiving time points of common mode signal symbols of the twisted pairs.

In the foregoing method provided in the embodiment of the present invention, a signal processing manner is determined; digital processing is performed, according to the determined signal processing manner, on signals of extended channels that are to be sent to convert the signals of the extended channels into common mode signals of each twisted pair that are to be sent; the converted common mode signals of the each twisted pair that are to be sent are sent to corresponding twisted pair for transmission. In this way, extended channels can be implemented at a transmitting end. In the embodiment of the present invention, in the process of implementing extended channels at the transmitting end, extended channels are implemented without the need of setting electronic switches, thereby reducing difficulties in implementing extended channels and simplifying the system structure.

Figure 4:
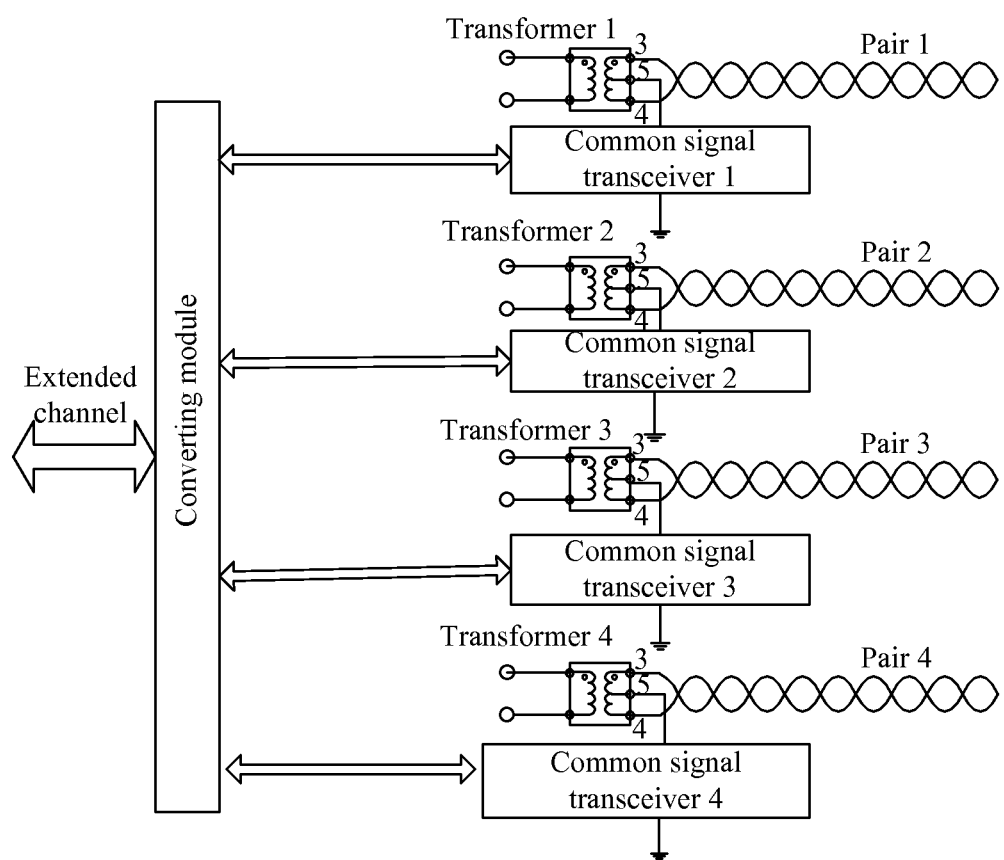
FIG. 4 is a schematic diagram illustrating a scenario where signals are processed based on a twisted pair according to an embodiment of the present invention.

To further understand the foregoing method for processing signals based on a twisted pair, the embodiment of the present invention is described with reference to a specific scenario. Referring to FIG. 4, FIG. 4 is a schematic diagram illustrating a scenario where signals are processed based on a twisted pair according to an embodiment of the present invention. As shown in FIG. 4, a common mode signal transceiver 1 to a common mode signal transceiver 4 are set in twisted pairs Pair 1, Pair 2, Pair 3, and Pair 4 respectively, where the common mode signal transceiver 1 to the common mode signal transceiver 4 are connected to a same converting module. The common mode signal transceiver 1 to the common mode signal transceiver 4 are connected to pins 5 of a transformer 1 to a transformer 4 bound to the twisted pairs Pair 1, Pair 2, Pair 3, and Pair 4, where the pin 5 is used as a center tap of the transformer and is configured to input/output common mode signals.

The converting module may perform, according to a signal processing manner (that is, equivalent to an extended channel generation manner), operation on signals X1, X2, and X3 of extended channels that are to be sent to convert the signals of the extended channels into common mode signals CM1, CM2, CM3, and CM4 of twisted pairs Pair 1, Pair 2, Pair 3, and Pair 4, and transmit the CM1, CM2, CM3, and CM4 to the common mode signal transceiver 1 to the common mode signal transceiver respectively. Then, the common mode signal transceiver 1 to the common mode signal transceiver 4 send the CM1, CM2, CM3, and CM4 to the twisted pairs Pair 1, Pair 2, Pair 3, and Pair 4 respectively for transmission.

In the scenario illustrated in FIG. 4, a converting module may convert, according to the signal processing manner (that is, equivalent to the extended channel generation manner), signals X1, X2, and X3 of extended channels that are to be sent into common mode signals CM1, CM2, CM3, and CM4 of twisted pairs Pair 1, Pair 2, Pair 3, and Pair 4; and the common mode signal transceiver 1 to the common mode signal transceiver 4 send the CM1, CM2, CM3, and CM4 to the twisted pairs Pair 1, Pair 2, Pair 3, and Pair 4 respectively for transmission. In the scenario illustrated in FIG. 4, extended channels are implemented without the need of setting electronic switches, thereby reducing difficulties in implementing extended channels and simplifying the system structure.

Embodiment 2

Figure 5:
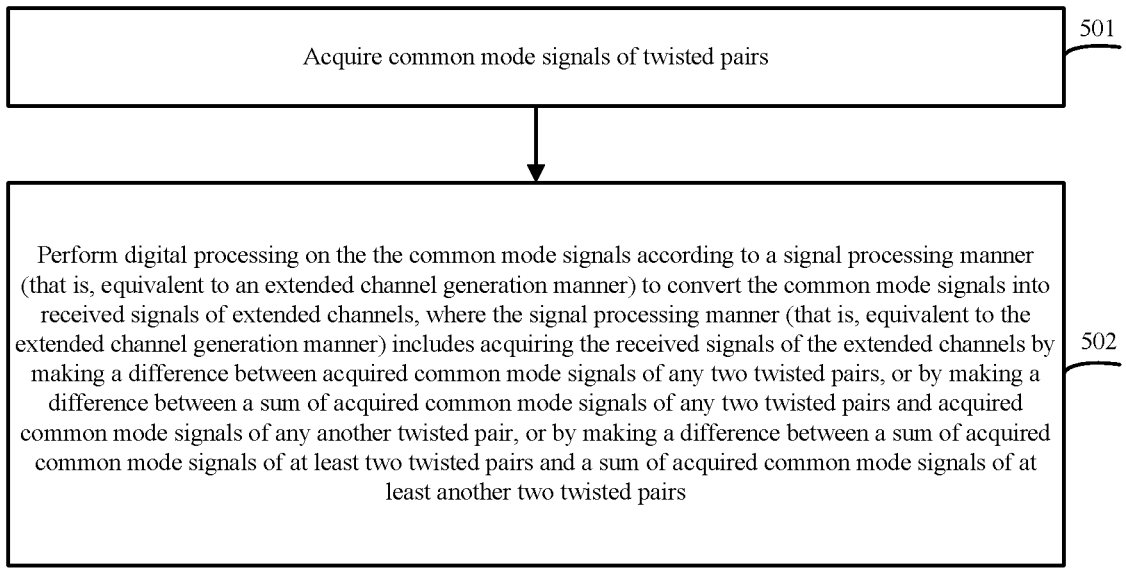
FIG. 5 is a schematic flowchart of another method for processing signals based on a twisted pair according to an embodiment of the present invention.

Referring to FIG. 5, FIG. 5 is a schematic flowchart of another method for processing signals based on a twisted pair according to an embodiment of the present invention. The method may include the following steps:

501. Acquire common mode signals of twisted pairs.

In Embodiment 2 of the present invention, a receiving end may receive common mode signals of each twisted pair by using a common mode signal transceiver. In other words, the receiving end may also set a common mode signal transceiver in each twisted pair like the transmitting end does, where the common mode signal transceiver is specifically connected to pins 5 of transformers bound to the twisted pairs and configured to receive common mode signals of twisted pair channels.

502. Perform digital processing on the common mode signals according to a signal processing manner (that is, equivalent to an extended channel generation manner) to convert the common mode signals into received signals of extended channels, where the signal processing manner (that is, equivalent to the extended channel generation manner) includes acquiring the received signals of the extended channels by making a difference between acquired common mode signals of any two twisted pairs, or by making a difference between a sum of acquired common mode signals of at least two twisted pairs and acquired common mode signals of any another twisted pair, or by making a difference between a sum of acquired common mode signals of at least two twisted pairs and a sum of acquired common mode signals of at least another two twisted pairs.

In Embodiment 2 of the present invention, all common mode signal transceivers set on the receiving end are connected to the same converting module, and the converting module may convert, according to the signal processing manner (that is, equivalent to the extended channel generation manner), common mode signals of twisted pairs into received signals in extended channels by using formulas similar to formulas (1) to (3).

For example, it is assumed that the extended channel generation manner is as follows: An extended channel 1 is generated by making a difference between common mode signals of twisted pairs Pair 1 and Pair 3, an extended channel 2 is generated by making a difference between common mode signals of twisted pairs Pair 2 and Pair 4, and an extended channel 3 is generated by making a difference between a sum of the common mode signals of the twisted pairs Pair 1 and Pair 3 and a sum of the common mode signals of the twisted pairs Pair 2 and Pair 4, a scenario where common mode signal transceivers and the converting module are set at the receiving end may also be illustrated in FIG. 4. A common mode signal transceiver 1 to a common mode signal transceiver 4 may transmit received common mode signals CM1, CM2, CM3, and CM4 in each of twisted pairs Pair 1 to Pair 4 to the converting module; the converting module convert, according to the relationships between the extended channel generation manner and the signal processing manner, the common mode signals CM1, CM2, CM3, and CM4 into received signals X1, X2, and X3 of the extended channel 1 to the extended channel 3 by using formulas (1) to (3).

As an alternative implementation manner, in the embodiment of the present invention, a signal processing manner (that is, equivalent to the extended channel generation manner) may be interacted between the transmitting end and the receiving end, so that it can be guaranteed that the transmitting end and the receiving end use the same signal processing manner (that is, equivalent to the extended channel generation manner). The process of interaction on the signal processing manner (that is, equivalent to the extended channel generation manner) between the transmitting end and the receiving end may be carried out at the channel initialization phase, and the signal processing manner is transmitted by using a field of a channel initialization interaction message. That is, the receiving end may receive the signal processing manner (that is, equivalent to the extended channel generation manner) sent by the transmitting end by using a channel initialization interaction message.

In Embodiment 2 of the present invention, a receiving end may perform digital processing on common mode signals of twisted pairs (for example, CM1, CM2, CM3, and CM4) according to a signal processing manner (that is, equivalent to an extended channel generation manner) to acquire various possible received signals in extended channels (that is, equivalent to a process of implementing various possible extended channels). In this way, extended channels can be implemented without the need of setting electronic switches, thereby reducing difficulties in implementing extended channels and simplifying the system structure.

Embodiment 3

In an embodiment of the present invention, the method for processing signals based on a twisted pair provided in Embodiment 1 and Embodiment 2 is not only applicable to single carrier transmission systems but also applicable to multicarrier transmission systems. In a frequency division multiplexing multicarrier system, a transmitting end may perform bit loading on data that needs to be sent, and carry the data by using multiple subcarriers. It is assumed that the total number of subcarriers is I, constellation mapping is performed on bits on each subcarrier to acquire frequency domain signals $X^{(i)}$ (i=1 to I, and $X^{(i)}$ denotes data on the $i^{th}$ subcarrier) of each frequency point, and then operations such as conjugation extension, inverse discrete Fourier transform (Inverse Discrete Fourier Transform, IDFT), and cyclic prefix addition are performed on $X^{(i)}$ to acquire time domain signals $x^{(j)}$ (j=1 to J, J denotes the number of sampling points in a symbol, and $x^{(j)}$ denotes signals on the sampling point in the $j^{th}$ time domain). Therefore, the time domain signals are also the sampling signals, and the sending/receiving time of each sampling point is referred to as a sampling time point. Similarly, the receiving end may perform interception and discrete Fourier transform (Discrete Fourier Transform, DFT) on the received time domain signals to acquire frequency domain signals $X^{(i)}$; after constellation decoding is performed on the frequency domain signals $X^{(i)}$, signals carried by channels may be acquired.

Figure 6:
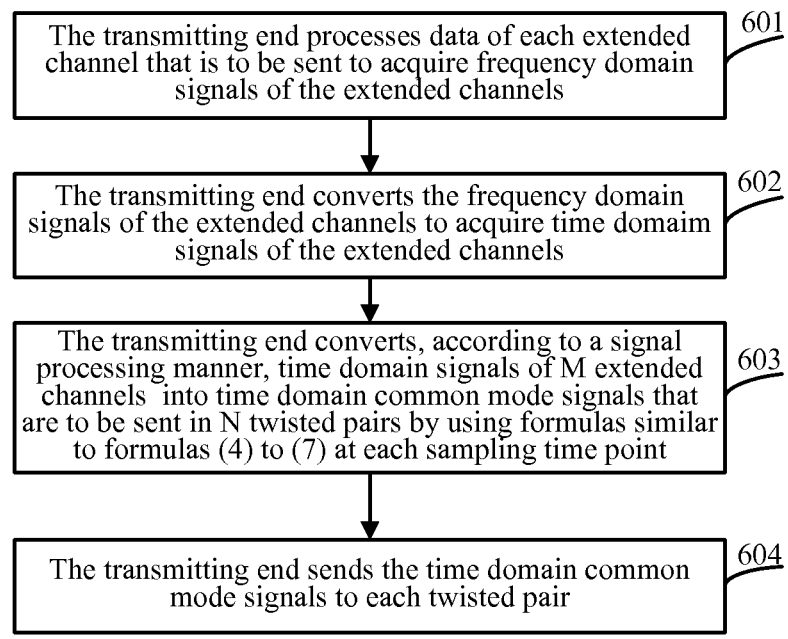
FIG. 6 is a schematic diagram illustrating a process of implementing extended channels in a time domain by a transmitting end according to an embodiment of the present invention.

When the method for processing signals based on a twisted pair provided in Embodiment 1 and Embodiment 2 is applied in multicarrier transmission systems, the conversion in Embodiment 1 and Embodiment 2 may be implemented in a time domain to implement channel extension; and the conversion in Embodiment 1 and Embodiment 2 may be also implemented in a frequency domain to implement channel extension. The specific implementation manner is as follows:

1. Extended channels are implemented in the time domain:

FIG. 6 illustrates a process of implementing extended channels in a time domain by a transmitting end, which may include the following steps:

601. The transmitting end processes data of each extended channel that is to be sent to acquire frequency domain signals $X_m^{(i)}$ of the extended channels.

For example, the transmitting end may perform bit loading and constellation mapping on the data of each extended channel that is to be sent to acquire frequency domain signals $X_m^{(i)}$ of the extended channels, where m denotes a sequence number of an extended channel and i denotes a sequence number of a subcarrier.

602. The transmitting end converts the frequency domain signals $X_m^{(i)}$ of the extended channels to acquire time domain signals $x_m^{(j)}$ of the extended channels.

As an alternative implementation manner, the transmitting end may perform operations of conjugation extension, IDFT, and cyclic prefix addition on the frequency domain signals $X_m^{(i)}$ of the extended channels to acquire the time domain signals $x_m^{(j)}$ (j=1 to J) of the extended channels.

m still denotes the sequence number of an extended channel, j denotes a sequence number of a sampling time point, and J denotes the total number of sampling points in a symbol.

603. The transmitting end converts, according to a signal processing manner (that is, equivalent to an extended channel generation manner), time domain signals $x_m^{(j)}$ (m=1 to M) of M extended channels into time domain common mode signals $x_n^{(j)}$ (n=1 to N) that are to be sent in N twisted pairs by using formulas similar to formulas (4) to (7) at each sampling time point j.

The time domain common mode signals $x_n^{(j)}$ (j=1 to J) are time sampling sequences that are to be sent to the $n^{th}$ twisted pair.

604. The transmitting end sends the time domain common mode signals $x_n^{(j)}$ to each twisted pair.

For example, the transmitting end may send the time domain common mode signals $x_n^{(j)}$ to an $n^{th}$ common mode signal transceiver at a $j^{th}$ sampling time point of a symbol, and the $n^{th}$ common mode signal transceiver sends the common mode signals $x_n^{(j)}$ to an $n^{th}$ twisted pair.

In the embodiment of the present invention, a transmitting end can implement extended channels in a time domain, and implement extended channels without the need of setting electronic switches, thereby reducing difficulties in implementing extended channels and simplifying the system structure.

Figure 7:
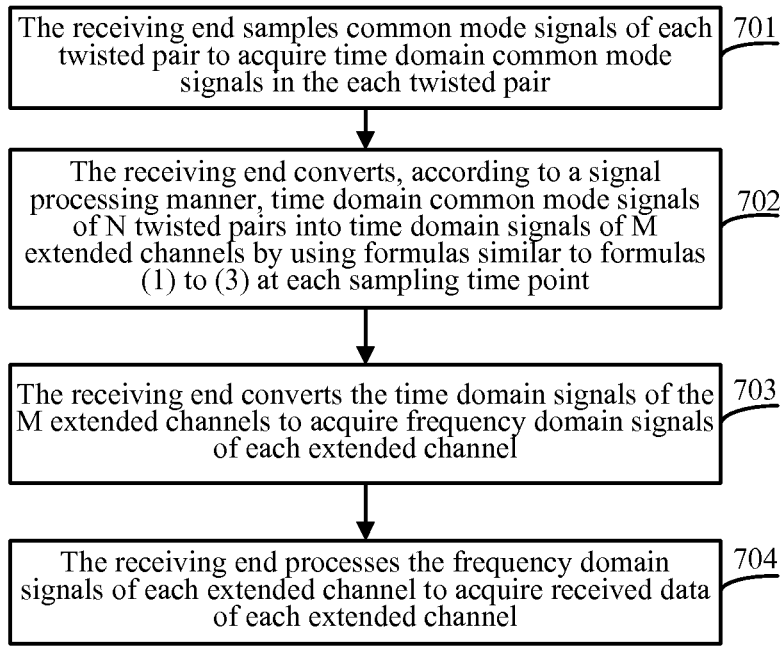
FIG. 7 is a schematic diagram illustrating a process of implementing extended channels in a time domain by a receiving end according to an embodiment of the present invention.

FIG. 7 illustrates a process of implementing extended channels in a time domain by a receiving end, which may include the following steps:

701. The receiving end samples common mode signals of each twisted pair to acquire time domain common mode signals $x_n^{(j)}$ (j=1 to J) of the each twisted pair.

The receiving end may sample common mode signals of each twisted pair by using a common mode signal transceiver. Each common mode signal transceiver samples common mode signals of the twisted pairs J times in a received symbol to acquire time domain common mode signals $x_n^{(j)}$ (j=1 to J), where n denotes a sequence number of a common mode signal transceiver, and j denotes a sequence number of a sampling time point. Therefore, $x_n^{(j)}$ may be regarded as signals received by the $n^{th}$ common mode signal transceiver at the $j^{th}$ sampling time point.

702. The receiving end converts, according to a signal processing manner (that is, equivalent to an extended channel generation manner), time domain common mode signals of N twisted pairs $x_n^{(j)}$ into time domain signals $x_m^{(j)}$ (m=1 to M) of M extended channels by using formulas similar to formulas (1) to (3) at each sampling time point j.

703. The receiving end converts the time domain signals $x_m^{(j)}$ (m=1 to M) of the M extended channels to acquire frequency domain signals $X_m^{(i)}$ (i=1 to I) of each extended channel.

As an alternative implementation manner, the receiving end may perform operations of interception, DTF, and cyclic prefix removal on the frequency domain common mode signals $x_m^{(j)}$ (m=1 to M) of each twisted pair to acquire the frequency domain signals $X_m^{(i)}$ (i=1 to I) of the extended channels, where I denotes the total number of subcarriers.

704. The receiving end processes the frequency domain signals $X_m^{(i)}$ of each extended channel to acquire received data of each extended channel.

For example, the receiving end may perform constellation decoding on the frequency domain signals $X_m^{(i)}$ of each extended channel to acquire received data of the extended channels.

In the embodiment of the present invention, a receiving end can implement extended channels in a time domain, and implement extended channels without the need of setting electronic switches, thereby reducing difficulties in implementing extended channels and simplifying the system structure.

Figure 8:
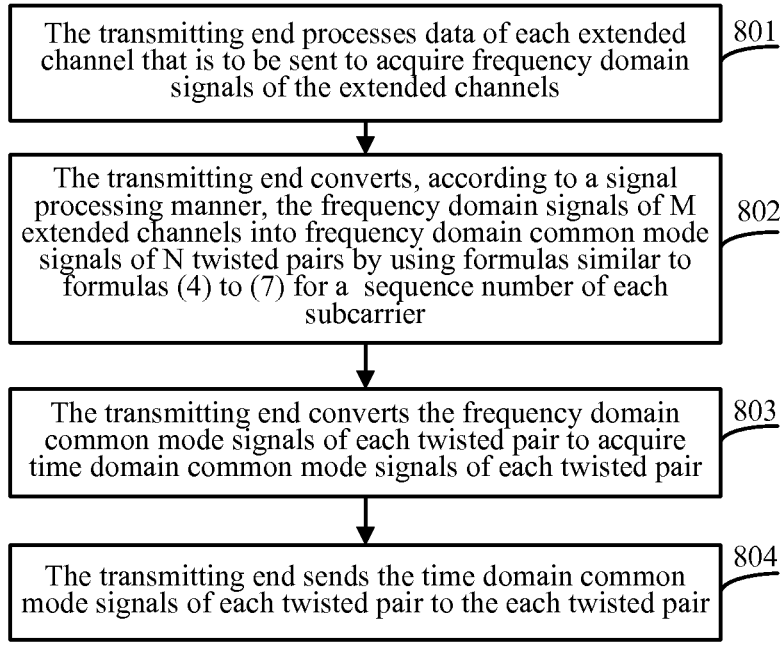
FIG. 8 is a schematic diagram illustrating a process of implementing extended channels in a frequency domain by a transmitting end according to an embodiment of the present invention.

2. Extended channels are implemented in a frequency domain:

FIG. 8 illustrates a process of implementing extended channels in a frequency domain by a transmitting end, which may include the following steps:

801. The transmitting end processes data of each extended channel that is to be sent to acquire frequency domain signals $X_m^{(i)}$ (i=1 to I) of the extended channels.

For example, the transmitting end may perform bit loading and constellation mapping on the data of each extended channel that is to be sent to acquire frequency domain signals $X_m^{(i)}$ of the extended channels, where m denotes a sequence number of an extended channel and i denotes a sequence number of a subcarrier.

802. The transmitting end converts, according to a signal processing manner (that is, equivalent to an extended channel generation manner), the frequency domain signals $X_m^{(i)}$ (m=1 to M) of M extended channels into frequency domain common mode signals $X_n^{(j)}$ (n=1 to N) of N twisted pairs by using formulas similar to formulas (4) to (7) for sequence number i of each subcarrier.

803. The transmitting end converts the frequency domain common mode signals $X_n^{(j)}$ (n=1 to N) of each twisted pair to acquire time domain common mode signals $x_n^{(j)}$ (j=1 to J) of each twisted pair.

As an alternative implementation manner, the transmitting end may perform operations of conjugation extension, IDFT, and cyclic prefix addition on the frequency domain common mode signals $X_n^{(j)}$ (n=1 to N) of each twisted pair to acquire the time domain common mode signals $x_n^{(j)}$ of each twisted pair, where j denotes a sequence number of a sampling time point.

804. The transmitting end sends the time domain common mode signals $x_n^{(j)}$ of each twisted pair to the each twisted pair.

The transmitting end may send the time domain common mode signals $x_n^{(j)}$ to an $n^{th}$ common mode signal transceiver, and the $n^{th}$ common mode signal transceiver sends the time domain common mode signals $x_n^{(j)}$ to an $n^{th}$ twisted pair.

In the embodiment of the present invention, a transmitting end can implement extended channels in a frequency domain, and implement extended channels without the need of setting electronic switches, thereby reducing difficulties in implementing extended channels and simplifying the system structure.

Figure 9:
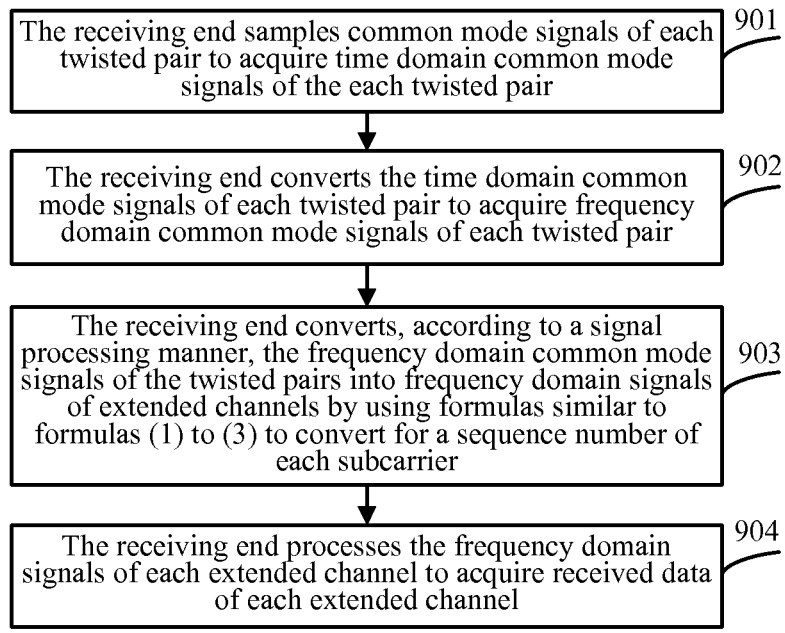
FIG. 9 is a schematic diagram illustrating a process of implementing extended channels in a frequency domain by a receiving end according to an embodiment of the present invention.

FIG. 9 illustrates a process of implementing extended channels in a frequency domain by a receiving end, which may include the following steps:

901. The receiving end samples common mode signals of each twisted pair to acquire time domain common mode signals $x_n^{(j)}$ (j=1 to J) of the each twisted pair.

The receiving end may sample common mode signals of each twisted pair by using a common mode signal transceiver. Each common mode signal transceiver samples the common mode signals of the twisted pairs J times in a received symbol to acquire time domain signals $x_n^{(j)}$, where n denotes a sequence number of a common mode signal transceiver, and j denotes a sequence number of a sampling time point.

902. The receiving end converts the time domain common mode signals $x_n^{(i)}$ of each twisted pair to acquire frequency domain common mode signals $X_n^{(i)}$ (i=1 to I) of each twisted pair, where i denotes a sequence number of a subcarrier.

As an alternative implementation manner, the receiving end may perform operations of interception, DTF, and cyclic prefix removal on the time domain common mode signals $x_n^{(j)}$ (j=1 to J) of each twisted pair to acquire the frequency domain common mode signals $X_n^{(i)}$ (i=1 to I) of the twisted pairs.

903. The receiving end converts, according to a signal processing manner (that is, equivalent to an extended channel generation manner), the frequency domain common mode signals $X_n^{(i)}$ (i=1 to I) of the twisted pairs into frequency domain signals $x_m^{(i)}$ of extended channels by using formulas similar to formulas (1) to (3) for sequence number i of each subcarrier.

904. The receiving end processes the frequency domain signals $X_m^{(i)}$ of each extended channel to acquire received data of each extended channel.

For example, the receiving end may perform constellation decoding on the frequency domain signals $X_m^{(i)}$ of each extended channel to acquire received data of the extended channels.

In the embodiment of the present invention, to ensure the transmission consistency, sampling time points of common mode signals of all twisted pairs should be aligned.

In the embodiment of the present invention, a receiving end can implement extended channels in a frequency domain, and implement extended channels without the need of setting electronic switches, thereby reducing difficulties in implementing extended channels and simplifying the system structure.

Embodiment 4

In an embodiment of the present invention, by using the method for processing signals based on a twisted pair provided in Embodiment 1 and Embodiment 2, M (1>M≤N−1) extended channels may be extended on the basis of N twisted pairs. To offset crosstalk effects of the N+M channels, in Embodiment 4 of the present invention, internal crosstalk of signals of the N+M channels may be eliminated. The combined crosstalk elimination may be implemented in a receiving direction and a transmitting direction at the same time.

In the receiving direction, the process of eliminating internal crosstalk may be as follows:

If M (1≤M≤N−1) extended channels are extended by using N twisted pairs, in the embodiment of the present invention, digital processing may be performed on common mode signals in the twisted pairs according to a signal processing manner (that is, equivalent to an extended channel generation manner) to acquire received signals of the extended channels, and then crosstalk offset processing is implemented on the received signals of the extended channels and differential mode signals of the twisted pairs on a combined basis. A crosstalk offset matrix used by the crosstalk offset processing is a matrix of N+M rows and N+M columns on each subcarrier.

In the embodiment of the present invention, the total number of twisted pairs and extended channels are N+M, and a corresponding channel transmission matrix is H. For each subcarrier, H is a matrix of (N+M)×(N+M). It is assumed that x is transmitted signal vector of (N+M)×1, y is a received signal vector of (N+M)×1, and n is a noise vector of (N+M)×1, the channel transmission equation may be expressed as follows:

$$y = Hx + n; \qquad (8)$$

Specifically, after crosstalk offset processing is performed on the received signal in the receiving direction, the channel transmission equation (8) is changed as follows:

$$\tilde{y} = WHx + Wn \qquad (9)$$

In the above equation, W is a crosstalk offset matrix of (N+M) x (N+M). When WH is a diagonal matrix, the internal crosstalk is eliminated in the receiving direction.

In the transmitting direction, the process of eliminating internal crosstalk is as follows:

When M (1≤M≤N−1) extended channels are extended by using N twisted pairs, the extended channels may include an NCEC and a CEC. In this way, in the embodiment of the present invention, before digital processing is performed, according to the signal processing manner (that is, equivalent to the extended channel generation manner), on data of extended channels that are to be sent, vector precoding processing may be performed on common mode signals of each twisted pair that are to be sent and differential mode signals of the twisted pairs, and then the common mode signals of each twisted pair that are to be sent and have undergone the vector precoding processing are sent to corresponding twisted pairs for transmission. A vector precoding matrix used during the vector precoding processing is a matrix of N+M rows and N+M columns on each subcarrier.

Specifically, when vector precoding processing is performed on transmitted signals in the transmitting direction, the transmitted signals may be represented as follows:

$$\tilde{x}=Px; \tag{10}$$

Accordingly, the channel transmission equation may be expressed as follows:

$$\tilde{y}=HPx+n \tag{11}$$

In the above equation, P is a vector precoding matrix of (N+M)×(N+M). When HP is a diagonal matrix, the internal crosstalk is eliminated in the transmitting direction.

In the embodiment of the present invention, the vector precoding matrix of the transmitting end and the crosstalk offset matrix of the receiving end may also be used at the same time. At this time, the transmitted signals may be represented as follows:

$$\tilde{x}=Px;$$

Accordingly, the channel transmission equation may be expressed as follows:

$$\tilde{y}=WHPx+Wn$$

When the WHP is a diagonal matrix, the internal crosstalk is eliminated.

Embodiment 5

In an embodiment of the present invention, internal crosstalk may be eliminated in the receiving direction by using the method provided in Embodiment 4. However, external interference such as radio frequency radiation (RFR) and crosstalk coming from lines other than vector (Vector) groups cannot be eliminated in the receiving direction by using the method provided in the Embodiment 4 of the present invention. External interference exerts influences on common mode signals and differential mode signals of twisted pairs at the same time, while the common mode signals suffer from stronger external interference signals. In Embodiment 5 of the present invention, common mode external interference signals may be estimated by using common mode signals from the common mode signals, and differential mode external interference signals in the differential mode signals may be estimated by using the estimated common mode external interference signals, thereby reducing the influence of external interference on the system.

Figure 10:
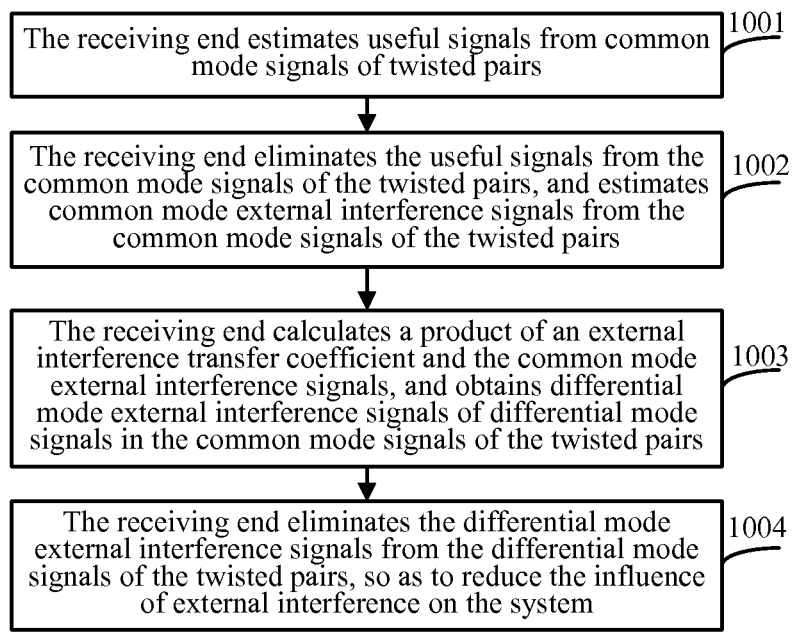
FIG. 10 is a schematic flowchart of a method for eliminating external interference according to an embodiment of the present invention.

Specifically, in the receiving direction, in the embodiment of the present invention, external interference may be eliminated before digital processing is performed on common mode signal according to an extended channel generation manner. As shown in FIG. 10, the process of eliminating external interference may include the following steps:

1001. The receiving end estimates useful signals from common mode signals of twisted p airs.

In the embodiment of the present invention, the receiving end may set a common mode signal transceiver to receive common mode signals of each twisted pair, and may estimate useful signals through an operation such as constellation decoding.

1002. The receiving end eliminates the useful signals from the common mode signals of the twisted pairs, and estimates common mode external interference signals from the common mode signals of the twisted pairs.

1003. The receiving end calculates a product of an external interference transfer coefficient and the common mode external interference signals, and obtains differential mode external interference signals of differential mode signals in the twisted pairs.

The external interference transfer coefficient is a coefficient for transferring the common mode external interference signals to the differential mode external interference signals.

1004. The receiving end eliminates the differential mode external interference signals from the differential mode signals of the twisted pairs, so as to reduce the influence of external interference on the system.

It is assumed that the differential mode signals of an $n^{th}$ twisted pair are $X_n$ and the coefficient for transferring the common mode external interference signals to the differential mode external interference signals is $G_n$, the differential mode external interference signals may be offset from the differential mode signals by the following formula (12):

$$\overline{X}_n=X_n-G_n\cdot Z_n \tag{12}$$

In the above formula, $\overline{X}_n$ denotes useful signals after the external interference signals are offset from the differential mode signals, $G_n$ may be acquired by measurement and training at the time of initialization, and $Z_n$ denotes the common mode external interference signals.

In formula (12), only the common mode external interference signals of the $n^{th}$ twisted pair are used to offset the differential mode external interference signals in the differential mode signals of the $n^{th}$ twisted pair. More generally, in the embodiment of the present invention, the common mode external interference signals of N twisted pairs may be used to eliminate the differential mode external interference signals in the differential mode signals of the nth twisted pair. In this way, the elimination method may be written in the following matrix form:

$$\overline{X}=X-G\cdot Z$$

In the matrix, X denotes a vector of differential mode signals whose value is N, G denotes an N*N external interference transfer coefficient matrix, Z denotes a vector of common mode external interference signals whose value is N, and $\overline{X}$ denotes a vector of a differential mode signal whose value is N after the differential mode external interference signals are eliminated. This method can eliminate external interference caused by N interference sources at most.

In the embodiment of the present invention, the common mode external interference signals are not only used to offset the differential mode external interference signals in the differential mode signals, but also be used to eliminate the common mode external interference signals of the extended channels. In this case, the signal vectors X and $\overline{X}$ are N'=N+M at most, including signals of differential mode channels and signals of extended channels, and the transfer coefficient matrix is a matrix of $N'^*{}_N$.

Embodiment 6

Figure 11:
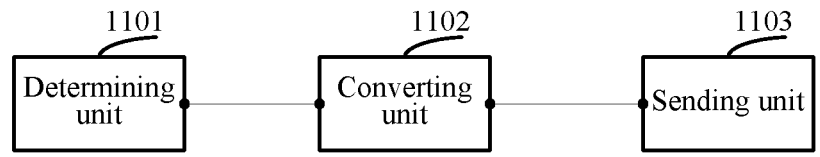
FIG. 11 is a schematic structural diagram of an apparatus for processing signals based on a twisted pair according to an embodiment of the present invention.

Referring to FIG. 11, FIG. 11 is a schematic structural diagram of an apparatus for processing signals based on a twisted pair according to an embodiment of the present invention. The apparatus provided in Embodiment 6 of the present invention can implement extended signals in a transmitting direction. The apparatus may include:

a determining unit 1101, configured to determine a signal processing manner, where the signal processing manner includes acquiring signals of each extended channel by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs;

For example, the determining unit 1101 may be configured to receive a signal processing manner sent by a receiving end by using a channel initialization interaction message.

a converting unit 1102, configured to perform, according to the signal processing manner determined by the determining unit 1101, digital processing on signals of the extended channels that are to be sent to convert the signals of the extended channels into common mode signals of each twisted pair; and a sending unit 1103, configured to send the common mode signals of each twisted pair that are to be sent converted by the converting unit 1102 to corresponding twisted pairs for transmission.

In the apparatus provided in Embodiment 6 of the present invention, the determining unit 1101 may determine a signal processing manner; the converting unit 1102 performs, according to the determined signal processing manner, digital processing on signals of the extended channels that are to be sent to convert the signals of the extended channels into common mode signals of each twisted pair that are to be sent; the sending unit 1103 sends the converted common mode signals of the each twisted pair that are to be sent to corresponding twisted pairs for transmission. In this way, extended channels can be implemented in the transmitting direction, and extended channels are implemented without the need of setting electronic switches, thereby reducing difficulties in implementing extended channels and simplifying the system structure.

Figure 12:
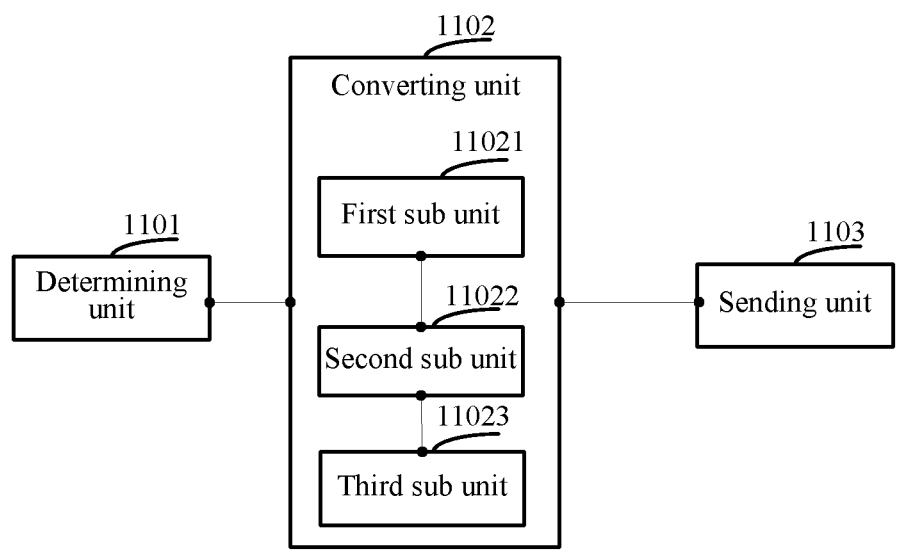
FIG. 12 is a schematic structural diagram of another apparatus for processing signals based on a twisted pair according to an embodiment of the present invention.

Referring to FIG. 12, FIG. 12 is a schematic structural diagram of another apparatus for processing signals based on a twisted pair according to an embodiment of the present invention. The apparatus illustrated in FIG. 12 is acquired by optimizing the apparatus illustrated in FIG. 11. In the apparatus illustrated in FIG. 12, the converting unit 1102 may include:

A first sub unit 11021 is configured to process data of extended channels that is to be sent to acquire frequency domain signals of the extended channels.

For example, the first sub unit 11021 may perform bit loading and constellation mapping on data of extended channels that are to be sent to acquire frequency domain signals of the extended channels.

A second sub unit 11022 is configured to convert the frequency domain signals of the extended channels acquired by the first sub unit 11021 to acquire time domain signals of the extended channels.

As an alternative implementation manner, the second sub unit 11022 may perform operations of conjugation extension, IDFT, and cyclic prefix addition on the frequency domain signals of the extended channels acquired by the first sub unit 11021 to acquire the time domain signals of the extended channels.

A third sub unit 11023 is configured to convert, according to the signal processing manner determined by the determining unit 1101, the time domain signals of the extended channels into time domain common mode signals that are to be sent of the each twisted pair.

As another implementable manner, in the apparatus illustrated in FIG. 12:

The first sub unit 11021 may process (for example, bit loading and constellation mapping) data of extended channels that are to be sent to acquire frequency domain signals of the extended channels.

Accordingly, the second sub unit 11022 may also convert, according to the signal processing manner determined by the determining unit 1101, the frequency domain signals of the extended channels acquired by the first sub unit 11021 into frequency domain common mode signals of each twisted pair.

Accordingly, the third sub unit 11023 may also be convert the frequency domain common mode signals of each twisted pair to acquire time domain common mode signals of each twisted pair.

As an alternative implementation manner, the third sub unit 11023 may perform operations of conjugation extension, IDFT, and cyclic prefix addition on the frequency domain common mode signals of each twisted pair to acquire time domain common mode signals of each twisted pair.

In the apparatus for processing signals provided in Embodiment 6 of the present invention, to ensure that signals of extended channels are mutually exclusive, the number of extended channels and the number of twisted pairs need to meet the following condition: $1 \leq M \leq N-1$, where M denotes the number of extended channels and N denotes the number of twisted pairs.

Figure 13:
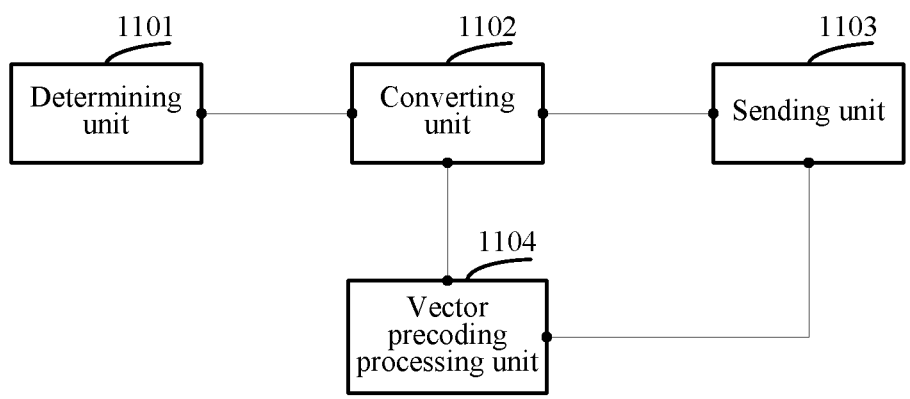
FIG. 13 is a schematic structural diagram of another apparatus for processing signals based on a twisted pair according to an embodiment of the present invention.

Referring to FIG. 13, FIG. 13 is a schematic structural diagram of another apparatus for processing signals based on a twisted pair according to an embodiment of the present invention. The apparatus illustrated in FIG. 13 is acquired by optimizing the apparatus illustrated in FIG. 11. The apparatus illustrated in FIG. 13 further includes the following units besides the determining unit 1101, the converting unit 1102, and the sending unit 1103:

a vector precoding processing unit 1104, configured to perform vector precoding processing on common mode signals of each twisted pair and differential mode signals of the twisted pairs before the converting unit 1102 performs, according to the signal processing manner, digital processing on signals of extended channels that are to be sent, where a vector precoding matrix used by the vector precoding processing is a matrix of N+M rows and N+M columns on each subcarrier.

Accordingly, the sending unit 1103 may be configured to send the common mode signals of each twisted pair processed by the vector precoding processing unit 1104 to each twisted pair.

In the apparatus illustrated in FIG. 13, the structure and function of the converting unit 1102 may be the same as that illustrated in FIG. 12.

In the apparatus for processing signals provided in Embodiment 6 of the present invention, sending time points of common mode signal symbols that are to be sent of all twisted pairs are aligned, and/or sampling time points of common mode signal symbols that are to be sent of all twisted pairs are aligned, to ensure that the transmissions of multiple twisted pairs are consistent.

Embodiment 7

Figure 14:
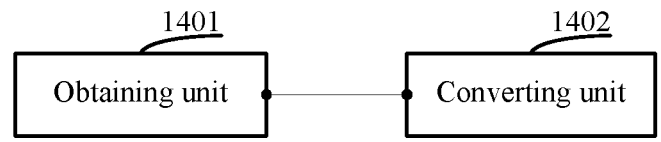
FIG. 14 is a schematic structural diagram of another apparatus for processing signals based on a twisted pair according to an embodiment of the present invention.

Referring to FIG. 14, FIG. 14 is a schematic structural diagram of an apparatus for processing signals based on a twisted pair according to an embodiment of the present invention. The apparatus provided in Embodiment 7 of the prevent invention can implement extended signals in a receiving direction. The apparatus may include:

an obtaining unit 1401, configured to acquire common mode signals of twisted pairs; and a converting unit 1402, configured to perform digital processing on the acquired common mode signal according to a signal processing manner to convert the common mode signals into received signals of extended channels, where the signal processing manner includes acquiring the received signals of the extended channels by making a difference between acquired common mode signals of any two twisted pairs, or by making a difference between a sum of acquired common mode signals of at least two twisted pairs and acquired common mode signals of any another twisted pair, or by making a difference between a sum of acquired common mode signals of at least two twisted pairs and a sum of acquired common mode signals of at least another two twisted pairs.

In the apparatus provided in Embodiment 7 of the present invention, the obtaining unit 1401 may acquire common mode signals of twisted pairs, and the converting unit 1402 may perform digital processing on the common mode signals according to a signal processing manner to convert the common mode signals into received signals of extended channels. In this way, extended channels are implemented. In the embodiment of the present invention, in the process of implementing extended channels, extended channels are implemented without the need of setting electronic switches, thereby reducing difficulties in implementing extended channels and simplifying the system structure.

Figure 15:
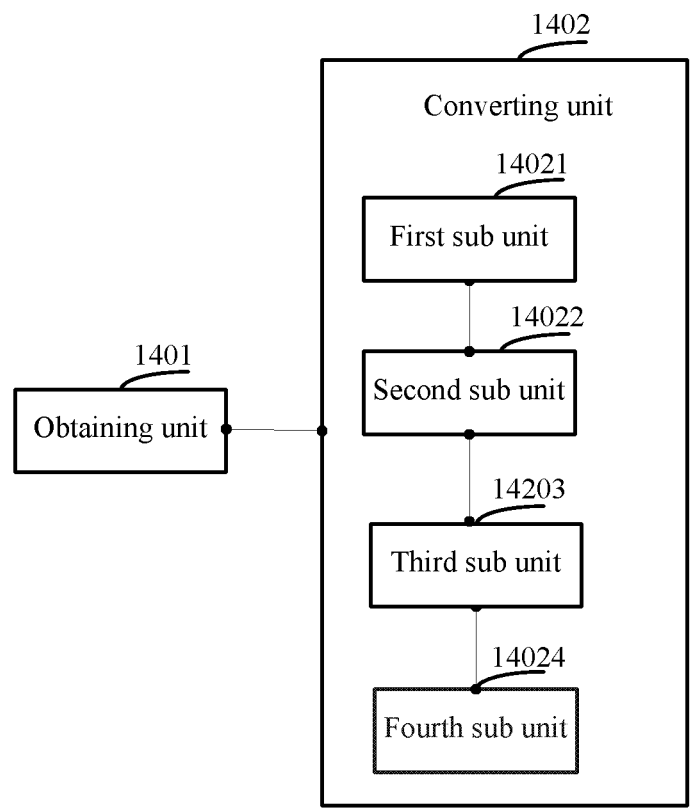
FIG. 15 is a schematic structural diagram of another apparatus for processing signals based on a twisted pair according to an embodiment of the present invention.

Referring to FIG. 15, FIG. 15 is a schematic structural diagram of another apparatus for processing signals based on a twisted pair according to an embodiment of the present invention. The apparatus illustrated in FIG. 15 is acquired by optimizing the apparatus illustrated in FIG. 14. In the apparatus illustrated in FIG. 15, the converting unit 1402 may include:

a first sub unit 14021, configured to sample common mode signals of twisted pairs to acquire time domain common mode signals of the twisted pairs;

a second sub unit 14022, configured to convert the time domain common mode signals of the twisted pairs into time domain signals of extended channels according to the signal processing manner;

a third sub unit 14023, configured to convert the time domain signals of the extended channels to acquire frequency domain signals of the extended channels;

As an alternative implementation manner, the third sub unit 14023 may perform operations of interception, DFT, and cyclic prefix removal on the time domain signals of the extended channels to acquire the frequency domain signals of the extended channels.

a fourth sub unit 14024, configured to process the frequency domain signals of the extended channels to acquire received data of the extended channels.

For example, the fourth sub unit 14024 may perform constellation decoding on the frequency domain signals of the extended channels to acquire received data of the extended channels.

As another implementable manner, in the apparatus illustrated in FIG. 15:

The first sub unit 14021 may sample common mode signals of twisted pairs to acquire time domain common mode signals of the twisted pairs.

Accordingly, the second sub unit 14022 may convert the time domain common mode signals of the twisted pairs to acquire frequency domain common mode signals of the twisted pairs.

As an alternative implementation manner, the second sub unit 14022 may perform operations of interception, DFT, and cyclic prefix removal on the time domain common mode signals of the twisted pairs to acquire the frequency domain common mode signals of the twisted p airs.

Accordingly, the third sub unit 14023 may convert the frequency domain common mode signals of the twisted pairs into frequency domain signals of the extended channels according to the signal processing manner.

Accordingly, the fourth sub unit 14024 may process the frequency domain signals of the extended channels to acquire received data of the extended channels.

Similarly, In the apparatus for processing signals provided in Embodiment 7 of the present invention, to ensure that signals of extended channels are mutually exclusive, the number of extended channels and the number of twisted pairs need to meet the following condition: $1 \leq M \leq N-1$, where M denotes the number of extended channels and N denotes the number of twisted pairs.

Figure 16:
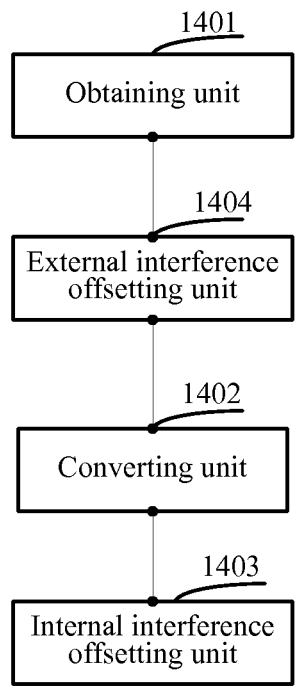
FIG. 16 is a schematic structural diagram of still another apparatus for processing signals based on a twisted pair according to an embodiment of the present invention.

Referring to FIG. 16, FIG. 16 is a schematic structural diagram of another apparatus for processing signals based on a twisted pair according to an embodiment of the present invention. The apparatus illustrated in FIG. 16 is acquired by optimizing the apparatus illustrated in FIG. 14. The apparatus illustrated in FIG. 16 may further include the following units besides the obtaining unit 1401 and the converting unit 1402:

an internal crosstalk offsetting unit 1403, configured to perform crosstalk offset processing on the received signals of the extended channels and differential mode signals of the twisted pairs after the converting unit 1402 performs digital processing on the common mode signals according to the signal processing manner, where a crosstalk offset matrix used by the crosstalk offset processing is a matrix of N+M rows and N+M columns on each subcarrier.

In the apparatus illustrated in FIG. 16, the structure and function of the converting unit 1402 may be the same as those illustrated in FIG. 15.

an external interference offsetting unit 1404, configured to estimate common mode external interference signals from common mode signals of twisted pairs before the converting unit 1402 performs digital processing on the common mode signals according to the signal processing manner; calculate a product of an external interference transfer coefficient and the common mode external interference signals, or calculate a product of an external interference transfer coefficient matrix and a vector of the common mode external interference signals to acquire differential mode external interference signals in the differential mode signals of the twisted pairs, and eliminate the differential mode external interference signals from the differential mode signals of the twisted pairs, where the external interference transfer coefficient is a coefficient for transferring the common mode external interference signals to the differential mode external interference signals.

Accordingly, the converting unit 1402 may convert, according to the signal processing manner, the common mode signals that have been processed by the external interference offsetting unit 1404 into received data of the extended channels.

In the apparatus for processing signals provided in Embodiment 7 of the present invention, receiving time points of common mode signal symbols that are to be sent of all twisted pairs are aligned, and/or sampling time points of common mode signal symbols of all twisted pairs are aligned to ensure that the transmissions of multiple twisted pairs are consistent.

In the apparatus for processing signals provided in the embodiment of the present invention, a signal processing manner is determined; digital processing is performed, according to the determined signal processing manner, on signals of extended channels that are to be sent to convert the signals of the extended channels into common mode signals of each twisted pair; the converted common mode signals of the each twisted pair are sent to corresponding twisted pairs for transmission. In this way, extended channels can be implemented at a transmitting end. In addition, in the embodiment of the present invention, common mode signals of twisted pairs may also be acquired, and digital processing is performed on the common mode signals according to a signal processing manner to convert the common mode signals into received signals of extended channels. In this way, extended channels can be implemented at a receiving end. In the embodiment of the present invention, in the process of implementing extended channels, extended channels are implemented without the need of setting electronic switches, thereby reducing difficulties in implementing extended channels and simplifying the system structure.

Embodiment 8

Figure 17:
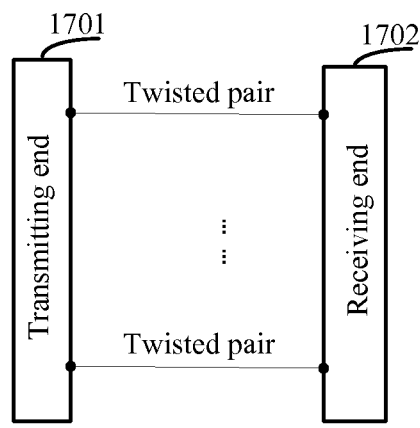
FIG. 17 is a schematic structural diagram of a system for processing signals based on a twisted pair according to an embodiment of the present invention.

Referring to FIG. 17, FIG. 17 is a schematic structural diagram of a system for processing signals based on a twisted pair according to an embodiment of the present invention. The apparatus provided in Embodiment 8 of the present invention can implement extended channels concurrently in a transmitting direction and a receiving direction. The apparatus may include:

a transmitting end 1701 and a receiving end 1702, where the transmitting end 1701 and the receiving end 1702 are connected by using twisted pairs.

The transmitting end 1701 is configured to determine a signal processing manner, where the signal processing manner includes acquiring signals of each extended channel by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs; perform, according to the signal processing manner, digital processing on signals of the extended channels that are to be sent to convert the signals of the extended channels into common mode signals of the each twisted pair; and send the converted common mode signals of the each twisted pair to corresponding twisted pairs for transmission to the receiving end 1702.

The structure of the transmitting end 1701 is the same as the structure of the apparatus for processing signals based on a twisted pair illustrated in any one of FIG. 11 to FIG. 13, which is not further described in the embodiment of the present invention.

The receiving end 1702 is configured to acquire common mode signals of twisted pairs, and perform digital processing on the acquired common mode signals according to the signal processing manner to convert the common mode signals into received signals of extended channels.

The structure of the receiving end 1702 is the same as the structure of the apparatus for processing signals based on a twisted pair illustrated in any one of FIG. 14 to FIG. 16, which is not further described in the embodiment of the present invention.

In the embodiment of the present invention, extended channels can be implemented concurrently in a transmitting direction and a receiving direction, and extended channels are implemented without the need of setting electronic switches, thereby reducing difficulties in implementing extended channels and simplifying the system structure.

In the system for processing signals provided in the embodiment of the present invention, a signal processing manner is determined; digital processing is performed, according to the determined signal processing manner, on signals of extended channels that are to be sent to convert the signals of the extended channels into common mode signals of each twisted pair; the converted common mode signals of the each twisted pair are sent to corresponding twisted pairs for transmission. In this way, extended channels can be implemented at a transmitting end. In addition, common mode signals of twisted pairs may also be acquired, and digital processing is performed on the common mode signals according to a signal processing manner to convert the common mode signals into received signals of extended channels. In this way, extended channels can be implemented at a receiving end. In the embodiments of the present invention, in the process of implementing extended channels, extended channels are implemented without the need of setting electronic switches, thereby reducing difficulties in implementing extended channels and simplifying the system structure.

Persons of ordinary skill in the art may understand that all or a part of the steps of the methods in the embodiments may be implemented by a program instructing relevant hardware. The program may be stored in a computer readable storage medium, and the storage medium may include: a flash drive, a read-only memory (Read-Only Memory, ROM), a random access memory (Random Access Memory, RAM), a magnetic disk, or an optical disk.

The method, apparatus, and system for processing signals provided in the embodiments of the present invention are described in detail above. The principle and implementation of the present invention are described herein through specific examples. The description about the embodiments of the present invention is merely provided for ease of understanding of the method and core ideas of the present invention. Persons of ordinary skill in the art can make variations and modifications to the present invention in terms of the specific implementations and application scopes according to the ideas of the present invention. Therefore, the specification shall not be construed as a limit to the present invention.

What is claimed is:

1. A method for processing signals based on a twisted pair, comprising:

determining a signal processing manner of M extended channels which are generated on the basis of N twisted pairs, wherein $1 \leq M \leq N-1$, and wherein the signal processing manner comprises acquiring signals of an extended channel by making a difference between common mode signals of any two of the N twisted pairs, or by making a difference between a sum of common mode signals of at least two of the N twisted pairs and common mode signals of any another of the N twisted pairs, or by making a difference between a sum of common mode signals of at least two of the N twisted pairs and a sum of common mode signals of at least another two of the N twisted pairs;

performing vector precoding processing on the common mode signals of the twisted pairs and differential mode signals of the twisted pairs, wherein a vector precoding matrix used by the vector precoding processing is a matrix of N+M rows and N+M columns on subcarriers;

performing, according to all signal processing manners of M extended channels, digital processing on signals of the extended channels and converting the signals of the extended channels into common mode signals of the N twisted pairs; and sending the converted common mode signals of the twisted pairs to corresponding twisted pairs for transmission.

2. The method for processing signals according to claim 1, wherein the performing, according to the signal processing manners of M extended channels, digital processing on signals of the extended channels that are to be sent to convert the signals of the extended channels into common mode signals of the twisted pairs comprises:

processing data of extended channels that is to be sent to acquire frequency domain signals of the extended channels that are to be sent;

converting the frequency domain signals of the extended channels to acquire time domain signals of the extended channels that are to be sent; and converting the time domain signals of the extended channel into time domain common mode signals of the twisted pairs according to the signal processing manner; and the converting the frequency domain signals of the extended channels to acquire time domain signals of the extended channels that are to be sent comprises:

performing operations of conjugation extension, inverse discrete Fourier transform, and cyclic prefix addition on the frequency domain signals of the extended channels to acquire time domain signals of the extended channels that are to be sent.

3. The method for processing signals according to claim 1, wherein the performing, according to the all signal processing manners of M extended channels, digital processing on signals of the extended channels that are to be sent to convert the signals of the extended channels into common mode signals of the twisted pairs comprises:

processing data of extended channels that is to be sent to acquire frequency domain signals of the extended channels that are to be sent;

converting the frequency domain signals of the extended channels into frequency domain common mode signals of the twisted pairs according to the signal processing manner; and converting the frequency domain common mode signals of the twisted pairs to acquire time domain common mode signals of the twisted pairs; and the converting the frequency domain common mode signals of the twisted pairs to acquire time domain common mode signals of the twisted pairs comprises:

performing operations of conjugation extension, inverse discrete Fourier transform, and cyclic prefix addition on the frequency domain common mode signals of the twisted pairs to acquire time domain common mode signals of the twisted pairs.

4. The method for processing signals according to claim 2, wherein the processing data of extended channels that is to be sent to acquire frequency domain signals of the extended channels that are to be sent comprises:

performing bit loading and constellation mapping on data of extended channels that is to be sent to acquire frequency domain common mode signals of the extended channels that are to be sent.

5. The method for processing signals according to claim 1, wherein sending time points of common mode signal symbols that are to be sent of the twisted pairs are aligned, and/or sampling time points of common mode signal symbols that are to be sent of the twisted pairs are aligned.

6. The method for processing signals according to claim 1, wherein the determining a signal processing manner comprising:

receiving a signal processing manner sent by a receiving end by using a channel initialization interaction message.

7. A method for processing signals based on a twisted pair, comprising:

acquiring common mode signals of twisted pairs;

performing digital processing on the common mode signals according to a signal processing manner to convert the common mode signals into received signals of extended channels, wherein the signal processing manner comprises acquiring the received signals of the extended channels by making a difference between common mode signals of any two of the twisted pairs, or by making a difference between a sum of common mode signals of at least two of the twisted pairs and common mode signals of any another of the twisted pairs, or by making a difference between a sum of common mode signals of at least two of the twisted pairs and a sum of common mode signals of at least another two of the twisted pairs; and performing crosstalk offset processing on the received signals of the extended channels and differential mode signals of the twisted pairs, wherein a crosstalk offset matrix used by the crosstalk offset processing is a matrix of N+M rows and N+M columns on subcarriers, wherein M denotes the number of the extended channels, N denotes the number of the twisted pairs, and $1 \leq M \leq N-1$.

8. The method for processing signals according to claim 7, wherein the performing digital processing on the common mode signals according to a signal processing manner to convert the common mode signals into received signals of extended channels comprises:

sampling the common mode signals of the twisted pairs to acquire time domain common mode signals of the twisted pairs;

converting the time domain common mode signals of the twisted pairs into time domain signals of the extended channels according to the signal processing manner;

converting the time domain signals of the extended channels to acquire frequency domain signals of the extended channels; and processing the frequency domain signals of the extended channels to acquire received data of the extended channels; and the converting the time domain signals of the extended channels to acquire frequency domain signals of the extended channels comprises:

performing operations of interception and discrete Fourier transform on the time domain signals of the extended channels to acquire frequency domain signals of the extended channels.

9. The method for processing signals according to claim 7, wherein the performing digital processing on the common mode signals according to a signal processing manner to convert the common mode signals into received signals of extended channels comprises:

sampling the common mode signals of the twisted pairs to acquire time domain common mode signals of the twisted pairs;

converting the time domain common mode signals of the twisted pairs to acquire frequency domain common mode signals of the twisted pairs;

converting the frequency domain common mode signals of the twisted pairs into frequency domain signals of the extended channels according to the signal processing manner; and processing the frequency domain signals of the extended channels to acquire received data of the extended channels; and the converting the time domain common mode signals of the twisted pairs to acquire frequency domain common mode signals of the twisted pairs comprises:

performing operations of interception and discrete Fourier transform on the time domain common mode signals of the twisted pairs to acquire frequency domain common mode signals of the twisted pairs.

10. The method for processing signals according to claim 8, wherein the processing the frequency domain signals of the extended channels to acquire received data of the extended channels comprises:
performing constellation decoding on the frequency domain signals of the extended channels to acquire received data of the extended channels.

11. The method for processing signals according to claim 7, wherein receiving time points of common mode signal symbols that are to be sent of the twisted pairs are aligned, and/or sampling time points of common mode signal symbols of the twisted pairs are aligned.

12. The method for processing signals according to claim 7, wherein before the performing digital processing on the common mode signals according to the signal processing manner, the method further comprises:
estimating common mode external interference signals from the common mode signals of the twisted pairs;
calculating a product of an external interference transfer coefficient and the common mode external interference signals, or calculating a product of an external interference transfer coefficient matrix and a vector of the common mode external interference signals to acquire differential mode external interference signals in the differential mode signals of the twisted pairs, wherein the external interference transfer coefficient is a coefficient for transferring the common mode external interference signals to the differential mode external interference signals; and
eliminating the differential mode external interference signals from the differential mode signals of the twisted pairs.

13. An apparatus for processing signals based on a twisted pair, comprising:
a determining unit, configured to determine a signal processing manner of M extended channels which are generated on the basis of N twisted pairs, wherein $1 \leq M \leq N-1$, and wherein the signal processing manner comprises acquiring signals of an extended channel by making a difference between common mode signals of any two of the N twisted pairs, or by making a difference between a sum of common mode signals of at least two of the N twisted pairs and common mode signals of any another of the N twisted pairs, or by making a difference between a sum of common mode signals of at least two of the N twisted pairs and a sum of common mode signals of at least another two of the N twisted pairs;
a converting unit, configured to perform, according to all signal processing manners of extended channels, digital processing on signals of the extended channels and convert the signals of the extended channels into common mode signals of each of the N twisted pairs;
a sending unit, configured to send the common mode signals of the twisted pairs converted by the converting unit to corresponding twisted pairs for transmission; and
a vector precoding processing unit, configured to perform vector precoding processing on the common mode signals of the twisted pairs and differential mode signals of the twisted pairs after the converting unit performs, according to the signal processing manner, digital processing on the signals of the extended channels that are to be sent, wherein a vector precoding matrix used by the vector precoding processing is a matrix of N+M rows and N+M columns on subcarriers.

14. The apparatus for processing signals according to claim 13, wherein the converting unit comprises:
a first sub unit, configured to process data of extended channels that is to be sent to acquire frequency domain signals of the extended channels;
a second sub unit, configured to convert the frequency domain signals of the extended channels acquired by the first sub unit to acquire time domain signals of the extended channels; and
a third sub unit, configured to convert, according to the signal processing manner determined by the determining unit, the time domain signals of the extended channels into time domain common mode signals that are to be sent of the twisted pairs, wherein:
the second sub unit is configured to perform operations of conjugation extension, inverse discrete Fourier transform, and cyclic prefix addition on the frequency domain signals of the extended channels to acquire time domain signals of the extended channels.

15. The apparatus for processing signals according to claim 13, wherein the converting unit comprises:
a first sub unit, configured to process data of extended channels that is to be sent to acquire frequency domain signals of the extended channels;
a second sub unit, configured to convert, according to the signal processing manner determined by the determining unit, the frequency domain signals of the extended channels into frequency domain common mode signals of the twisted pairs; and
a third sub unit, configured to convert the frequency domain common mode signals of the twisted pairs to acquire time domain common mode signals of the twisted pairs, wherein:
the third sub unit is configured to perform operations of conjugation extension, inverse discrete Fourier transform, and cyclic prefix addition on the frequency domain common mode signals of the twisted pairs to acquire time domain common mode signals of the twisted pairs.

16. An apparatus for processing signals based on a twisted pair, comprising:
an obtaining unit, configured to acquire common mode signals of twisted pairs;
a converting unit, configured to perform digital processing on the common mode signals according to a signal processing manner to convert the common mode signals into received signals of extended channels, wherein the signal processing manner comprises acquiring the received signals of the extended channels by making a difference between common mode signals of any two of the twisted pairs, or by making a difference between a sum of common mode signals of at least two of the twisted pairs and common mode signals of any another of the twisted pairs, or by making a difference between a sum of common mode signals of at least two of the twisted pairs and a sum of common mode signals of at least another two of the twisted pairs; and
an internal crosstalk offsetting unit, configured to perform crosstalk offset processing on the received signals of the extended channels and differential mode signals of the twisted pairs after the converting unit performs digital processing on the common mode signals according to the signal processing manner, wherein a crosstalk offset matrix used b the crosstalk offset processing is a matrix of N+M rows and N+M columns on subcarriers, wherein M denotes the number of the extended channels, N denotes the number of the twisted pairs, and $1 \leq M \leq N-1$.

17. The apparatus for processing signals according to claim 16, wherein the converting unit comprises:
- a first sub unit, configured to sample the common mode signals of the twisted pairs to acquire time domain common mode signals of the twisted pairs;
- a second sub unit, configured to convert the time domain common mode signals of the twisted pairs into time domain signals of the extended channels according to the signal processing manner;
- a third sub unit, configured to convert the time domain signals of the extended channels to acquire frequency domain signals of the extended channels; and
- a fourth sub unit, configured to process the frequency domain signals of the extended channels to acquire received data of the extended channels, wherein:
- the third sub unit is configured to perform operations of interception, discrete Fourier transform, and cyclic prefix removal on the time domain signals of the extended channels to acquire the frequency domain signals of the extended channels.

18. The apparatus for processing signals according to claim 16, wherein the converting unit comprises:
- a first sub unit, configured to sample the common mode signals of the twisted pairs to acquire time domain common mode signals of the twisted pairs;
- a second sub unit, configured to convert the time domain common mode signals of the twisted pairs to acquire frequency domain common mode signals of the twisted pairs;
- a third sub unit, configured to convert the frequency domain common mode signals of the twisted pairs into frequency domain signals of the extended channels according to the signal processing manner;
- a fourth sub unit, configured to process the frequency domain signals of the extended channels to acquire received data of the extended channels, wherein:
- the second sub unit is configured to perform operations of interception, discrete Fourier transform, and cyclic prefix removal on the time domain common mode signals of the twisted pairs to acquire frequency domain common mode signals of the twisted pairs.

19. The apparatus for processing signals according to claim 16, further comprising:
- an external interference offsetting unit, configured to estimate common mode external interference signals from the common mode signals of the twisted pairs before the converting unit performs digital processing on the common mode signals according to the signal processing manner; calculate a product of an external interference transfer coefficient and the common mode external interference signals, or calculate a product of an external interference transfer coefficient matrix and a vector of the common mode external interference signals to acquire differential mode external interference signals in the differential mode signals of the twisted pairs, and eliminate the differential mode external interference signals from the differential mode signals of the twisted pairs, wherein the external interference transfer coefficient is a coefficient for transferring the common mode external interference signals to the differential mode external interference signals.

20. A system for processing signals based on a twisted pair, comprising:
- a transmitting end; and
- a receiving end, wherein:
- the transmitting end is configured to determine a signal processing manner, wherein the signal processing manner comprises acquiring signals of extended channels by making a difference between common mode signals of any two twisted pairs, or by making a difference between a sum of common mode signals of at least two twisted pairs and common mode signals of any another twisted pair, or by making a difference between a sum of common mode signals of at least two twisted pairs and a sum of common mode signals of at least another two twisted pairs; perform, according to the signal processing manner, digital processing on signals of the extended channels and convert the signals of the extended channels into common mode signals of the twisted pairs; and send the converted common mode signals of the twisted pairs to corresponding twisted pairs for transmission to the receiving end; and
- the receiving end is configured to acquire common mode signals of the twisted pairs, and perform digital processing on the common mode signals according to the signal processing manner to convert the common mode signals into received signals of the extended channels;

wherein the transmitting end further comprises:
- a vector precoding processing unit, configured to perform vector precoding processing on the common mode signals of the twisted pairs and differential mode signals of the twisted pairs before digital processing is performed on the signals of the extended channels that are to be sent, wherein a vector precoding matrix used by the vector precoding processing is a matrix of N+M rows and N+M columns on subcarriers, wherein M denotes the number of the extended channels, N denotes the number of the twisted pairs, and $1 \leq M \leq N-1$;

the receiving end further comprises:
- an internal crosstalk offsetting unit, configured to perform crosstalk offset processing on the received signals of the extended channels and the differential mode signals of the twisted pairs after digital processing is performed on the common mode signals according to the signal processing manner, wherein a crosstalk offset matrix used by the crosstalk offset processing is a matrix of N+M rows and N+M columns on subcarriers, wherein M denotes the number of the extended channels, N denotes the number of the twisted pairs, and $1 \leq M \leq N-1$.

21. The signal processing system according to claim 20, wherein the receiving end further comprises:
- an external interference offsetting unit, configured to estimate common mode external interference signals from the common mode signals of the twisted pairs before the digital processing is performed on the common mode signals according to the signal processing manner; calculate a product of an external interference transfer coefficient and the common mode external interference signals, or calculate a product of an external interference transfer coefficient matrix and a vector of the common mode external interference signals to acquire differential mode external interference signals in the differential mode signals of the twisted pairs, and eliminate the differential mode external interference signals from the differential mode signals of the twisted pairs, wherein the external interference transfer coefficient is a coefficient for transferring the common mode external interference signals to the differential mode external interference signals.

22. A non-transitory computer-readable storage medium storing computer readable code comprising a program which when executed by a computer unit, enables the computer unit to implement the method of claim 1.

* * * * *